DATA TRANSMISSION APPARATUS FOR GENERATING A REDUNDANT INFORMATION SIGNAL CONSISTING OF SUCCESSIVE PULSES FOLLOWED BY SUCCESSIVE INVERSE PULSES

Filed May 12, 1965

INVENTORS
ETIENNE GOROG
C. MICHAEL MELAS
BY H L Kneal
AGENT

United States Patent Office 3,419,804

Patented Dec. 31, 1968

3,419,804

DATA TRANSMISSION APPARATUS FOR GENERATING A REDUNDANT INFORMATION SIGNAL CONSISTING OF SUCCESSIVE PULSES FOLLOWED BY SUCCESSIVE INVERSE PULSES

Etienne P. Gorog and Constantine Michael Melas, Antibes, France, assignors to International Business Machines Corporation, Armonk, N.Y., a corporation of New York Filed May 12, 1965, Ser. No. 455,112

13 Claims. (Cl. 325—38)

ABSTRACT OF THE DISCLOSURE

A data transmission device having the shifted spectrum of the redundant information signal at a maximum near the center frequency of the bandpass characteristic of the transmission line. This device has a pulse source whose non-zero outputs occur every T second and for less than .5T second where T is the period of the frequency $1/T$ equal to ½ bandwidth of the bandpass characteristic of a transmission line. The output of the pulse source is delayed .5T second, then inverted, and combined with the output of the pulse source forming a signal having a non-zero portion followed by the inverted non-zero portion.

This invention relates to apparatus for generating data representative codes so that data may be transmitted directly along any transmission line. More specifically, it relates to apparatus for generating a signal from data which has a frequency spectrum that is matched to the bandpass characteristic of the transmission line.

It is known to transmit information by modulating a carrier wave with the data to be transmitted. In telegraphy, for instance, it is known to modulate signals by a carrier wave to have them transmitted over the telephone lines and systems, the general characteristics of which do not permit the transmission of the data itself.

A drawback to such a modulation is that it requires the provision of a carrier wave, but it further has the defects of all modulations in that such modulation is suitable only if the variation of the modulating signals is sufficiently different from that of the carrier wave.

To obviate such inconveniences, especially when the rapidity of the variations of the telegraphic states may reach values approaching that of the carrier wave frequency which can not be increased because of the upper limits of the line, it has been contemplated to consider the succession of the telegraphic states or of the states directly derived therefrom, and its combination with a wave of a much lower frequency. (As, usually, the frequency of the carrier wave is the higher, some publications happen, in the above case, to refer to the succession of telegraphic states as the carrier.) Such a method is disadvantageous in that the signals finally transmitted along a telephone channel have a very complex form, lend themselves very little to frequency transposition, are difficult to detect and readily disturbed by noises.

An object of the invention is the determination and the realization of codes, which by the very succession of their signals may be transmitted over telephone lines or systems, whatever the successive values of the basic elements to be transmitted.

A more specific object of the invention is the generation from data signals which behave like bands of frequencies normally transmitted by telephone lines.

In accordance with this invention the above objects are accomplished by generating a redundant information signal consisting of successive pulses followed by successive inverse pulses. Each pulse has its inverted pulse following it .5T second later. T is the period of a frequency $1/T$ equal to ½ bandwidth of the bandpass characteristic of a transmission line. The bandwidth is the difference between the limiting frequencies of the bandpass characteristic of the transmission line.

The spectrum of the redundant information signal will be maximum near and symmetrical about the frequency $1/T$ and zero near the frequencies zero and $2(1/T)$. If the redundant information signal is frequency shifted so that the frequency shift plus or minus the frequency $1/T$ equals the center frequency of the bandpass characteristic, the shifted spectrum of the redundant information signal will be maximum near the center frequency of the bandpass characteristic of the transmission line. The spectrum is matched to the bandpass characteristic in the sense that the spectrum after being shifted is maximum near and symmetrical about the center frequency of the bandpass characteristic.

The basic elements of the invention are: first, a pulse source to generate successive pulses where the total duration of the successive pulses must be less than .5T second; second, an inverter to invert the successive pulses; third, a delay to delay the inverted successive pulses .5T second; and finally, a collector to collect the successive pulses and the inverted successive pulses. The collected signal is the desired redundant information signal where each pulse has its inverted pulse following it by .5T second. The above mentioned pulse source could generate pulses with each pulse encoded to convey many binary bits of information.

The redundancy in the information signal may be used at the receiver to reinforce the successive pulses. By delaying the received signal by .5T second, inverting it and adding it to itself, the received inverse successive pulses are reinverted and added to the received successive pulses to double the latter's magnitude.

The great advantage of our invention is that the spectrum of the redundant information signal is matched to the bandpass characteristic of the transmission line. Additional advantages are the absence of a D.C. component in the redundant information signal and use of the redundancy at the receiver to reinforce the information received.

The foregoing and other objects, features, and advantages of the invention will be apparent from the following more particular description of preferred embodiments of the invention, as illustrated in the accompanying drawings.

In the drawings:

FIG. 1*a* shows a data transcoding.

FIG. 1*b* shows the spectrum of a basic signal.

FIGS. 2*a* and 2*d* represent a coding operation for two bits.

FIGS. 3*a* and 3*b* represent the signal resulting from the inverted repetition of a binary element or bit.

FIG. 4 represents in an identical way the inverted repetition extended to two binary elements.

FIGS. 5*a* and 5*b* represent the inverted repetition of two elements A and B with four levels derived from four binary elements (bits).

FIG. 6 represents the diagram of the coder performing the operations of FIGS. 5*a* and 5*b*.

FIG. 7*a* represents the diagram of the detector.

FIG. 7*b* represents the succession of the signals received and their transformed curves.

Figure 11:
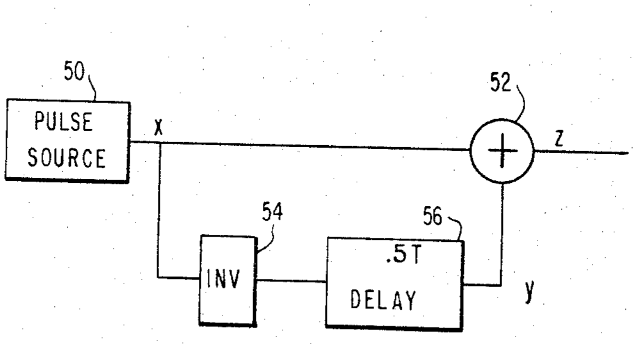
FIG. 11 is a diagram of the basic elements required to practice the invention.
Figure 12A:
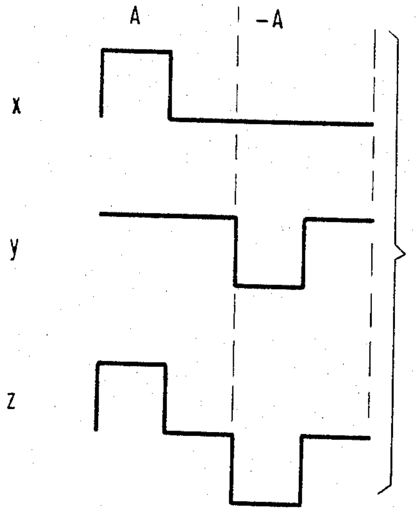
Figure 12C:
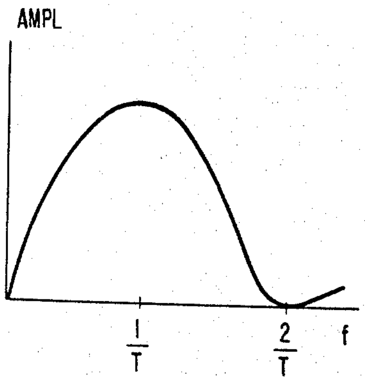
Figure 12B:
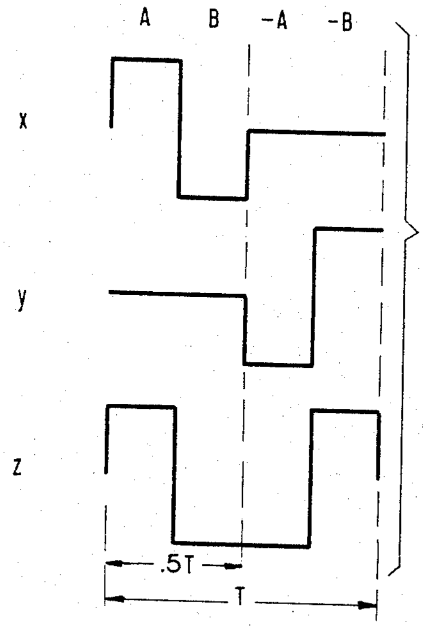

FIGS. 12*a* and 12*b* represent the waveforms in the circuit of FIG. 11.

FIG. 12*c* represents the spectrum of the waveform *z* in FIGS. 12*a* and 12*b*.

Figures 1A, 1B:
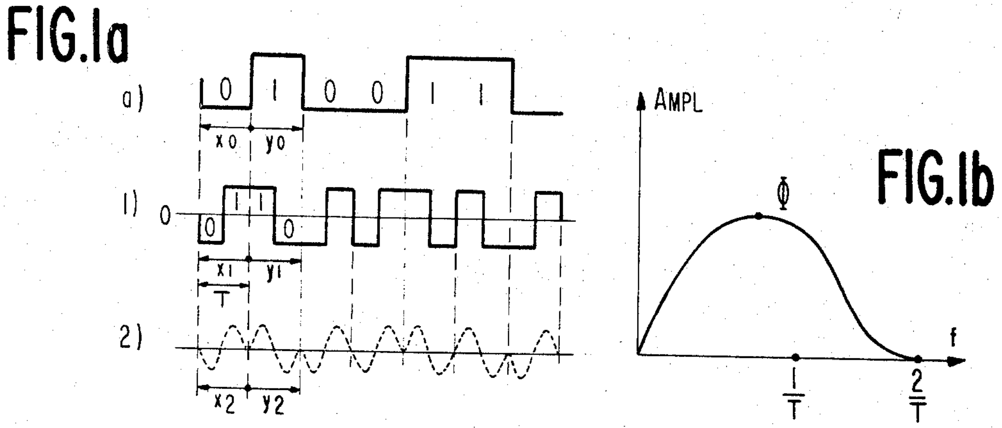

In FIG. 1*a*, there is shown a transcoding of the binary data in line (a) wherein any bit 0 or 1 is represented by two bits 0, 1: 0–1 for 0, and 1–0 for 1. The signals obtained are then those of line 1. In line 2, there is represented the fundamental frequency; it is seen in $x_2$ and $y_2$ that the representations of 0 and 1 are phase-shifted in the latter by $\pi$. FIG. 1*b* represents the frequency spectrum $\Phi$ of a compound signal 0, 1, wherein T represents the period of that signal; it shows up that there exists no direct component.

Figures 2A, 2B, 2C, 2D:
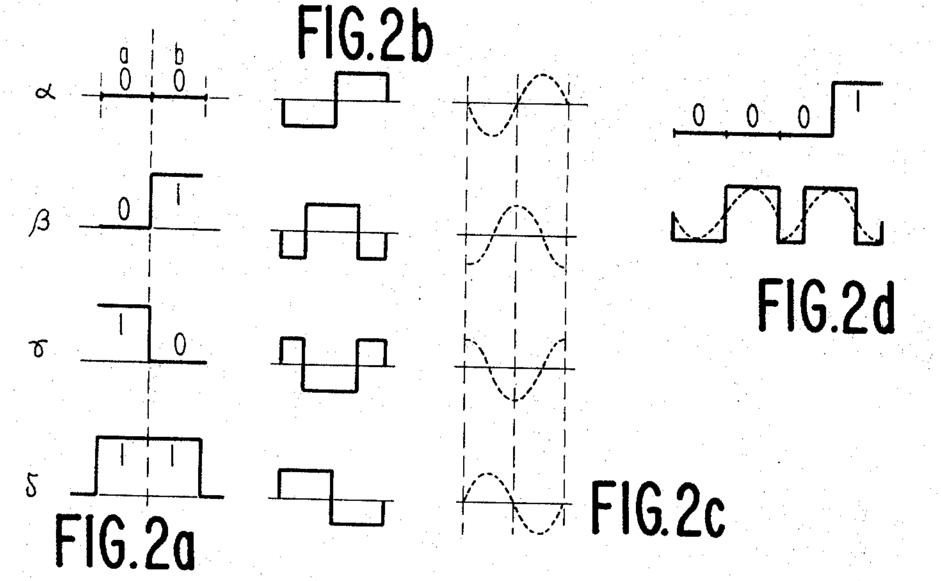

FIG. 2*a* represents, in lines $\alpha\beta\gamma\delta$ the four possible combinations of two binary elements *a* and *b*. FIG. 2*b* provides a possible coding of each of the combinations on lines $\alpha\beta\gamma\delta$; FIG. 2*c* shows the corresponding fundamental frequency and its successive phase-shifts by $\pi/2$ for each of the four combinations. FIG. 2*d* shows up this phase-shift during the transmission of two bits 0, 0 followed with two bits 0, 1.

Figure 3B:
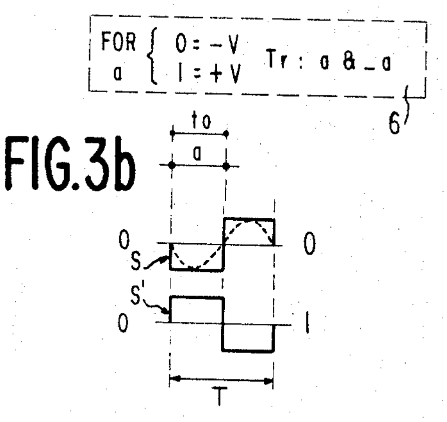
Figure 3A:
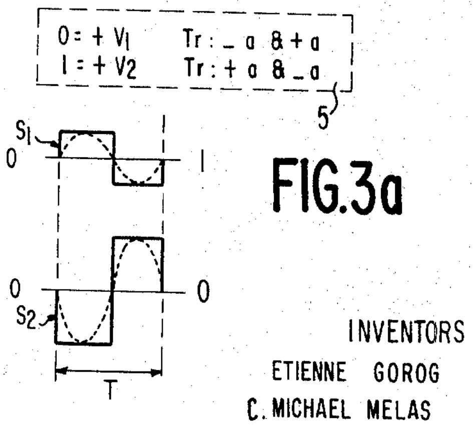
Figures 4, 5A, 5B:
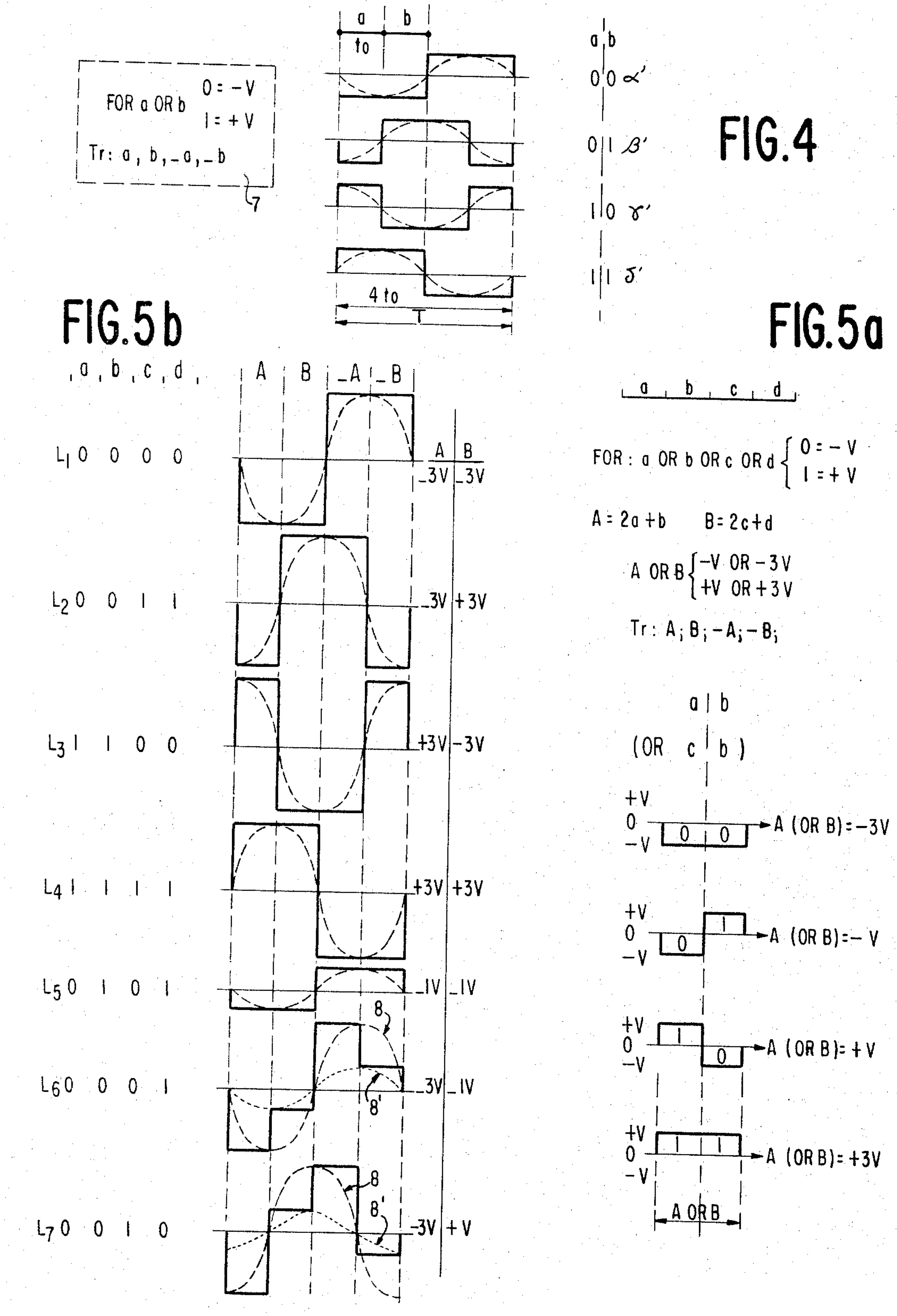

The FIGS. 3*a*, 3*b* and 4 show examples indicating that the transmission of the bits and their inverses provides signals identical to those shown in particular in FIGS. 1*a*, 2*a*, to 2*d*.

Let us examine those examples. In FIG. 3*a*, table 5 specifies that in bits "*a*" the values 0 are represented by $+V_1$, and the values 1 by $+V_2$. If, when "*a*"$=+V_1$, $-$"*a*" and $+$"*a*" are transmitted along the line, and when "*a*"$=+V_2$, $+$"*a*" and $-$"*a*" are transmitted along the line, the resulting signals $S_1$ and $S_2$ are identical to those of FIG. 1*a* (line 1) and are similarly phase-shifted by $\pi$. It is to be noted that, depending on the value of V, $-$"*a*" and $+$"*a*," or $+$"*a*" and $-$"*a*" are transmitted. There is one much simpler case to which this may come, for it is always possible to give "*a*" two opposite levels +V and −V to represent its two values of 0 and 1. As recalled in Table 6 of FIG. 3*b*, it will suffice in all cases to transmit successively "*a*" and −"*a*" to obtain signals S and S′ which also are identical to those of FIG. 1*a*. This is advantageous in that only one implementation is required for such a transcoding. It will be noted that the duration T of the signals S or S′ (as well as that of $S_1$ and $S_2$) is equal to $2t_0$, if $t_0$ designates the duration of bit "*a*," and that signals of a duration T equal to that of the bits might be obtained by combining the original signals with pulses in an exclusive OR circuit.

In the cases examined below, it will be supposed that for each bit such as "*a*" the values 0 and 1 are represented by two levels −V and +V.

Let us consider the case when two bits "*a*" and "*b*," in both of which 0 corresponds to −V and 1 to +V, are transmitted together. By successively transmitting along the line: *a*, *b*, −*a*, −*b*, one obtains the signals shown in lines $\alpha'\beta'\gamma'\delta'$ of FIG. 4 and corresponding to the various possible combinations of the values of "*a*" and "*b*."

Table 7 of FIG. 4 recalls the above indicated conditions. The resulting signals are identical to those shown in FIGS. 2*a* and 2*d*; the signal duration T is equal to twice the duration of "*a*" and "*b*" together.

All of the transcoded signals in FIGS. 1 to 4 will have a frequency spectrum as shown in FIG. 1*b*. If the frequency $1/T$ in FIG. 1*b* were near the center frequency of the transmission line bandpass characteristic, the transmission line would be more likely to carry the transcoded signal without distortion. This is because the center of the spectrum would be near the center of the bandpass characteristic. To get the frequency spectrum matched in this way to the bandpass characteristic of the transmission line it is necessary, first, to generate a signal with the spectrum shown in FIG. 1*b* centered about a frequency $1/T$ equal to ½ bandwidth of the bandpass characteristic, and second, to frequency shift the signal so that the frequency shift plus or minus the frequency $1/T$ equals the center frequency of the bandpass characteristic. This invention is directed at generating a spectrum as shown in FIG. 1*b* centered about a frequency $1/T$ equal ½ bandwidth of the bandpass characteristic of the transmission line. FIG. 11 shows apparatus for generating from a pulse a spectrum such as that in FIG. 1*b*. Referring to FIG. 11 pulse source 50 sends pulses to collector 52 and inverter 54. From the inverter the pulse passes through delay 56 and then to the collector 52. The delay amounts to .5T second.

FIG. 12*a* shows the signals in the circuit of FIG. 11 at the three points *x*, *y*, and *z*. In FIG. 12*a* line *x* indicates that a pulse A of a duration less than .5T has been emitted from pulse source 50. The pulse appears .5T second later as −A at point *y* in the circuit of FIG. 11. The signals at *x* and *y* are then summed and the resulting signal *z* appears at the output. A mathematical analysis of the waveform *z* shows that the spectrum of this waveform is that shown in FIG. 12*c* with the strongest frequency components near the frequency $1/T$ and no frequency components at 0 frequency and the frequency $2/T$.

FIG. 12*b* shows the signals at points *x*, *y*, and *z* in the circuit of FIG. 11 when the pulse source generates two successive pulses. Since the pulses A and B follow in succession and their total duration is less than .5T the final composite signal at point *z* will have basically the same frequency spectrum as the single pulse operation shown in FIG. 12*a*. Both the signals shown in FIG. 12*a* and in FIG. 12*b* have basically the same frequency spectrum shown in FIG. 12*c*.

A mathematical and experimental study shows that such a transmission mode adapts itself quite well to the transmission of elements capable of assuming more than two levels, the resulting signals behaving as if transmitted by mixed modulation.

Let us suppose for example the case of four binary elements *a*, *b*, *c*, *d*, for each of which 0 corresponds to −V and 1 corresponds to +V. The algebraic analog addition of these elements if performed two by two so as to form the two following elements:

$$A=2a+b$$
$$B=2c+d$$

FIG. 5*a* indicates the values of A (or of B) in function of the possible combinations of "*a*" and "*b*" or "*c*" and "*d*"; thus:

For:

$a=0$ and $b=0$, the level of A is −3V
$a=0$ and $b=1$, the level of A is −V

The transmission of the four binary elements *a*, *b*, *c*, *d*, comes to transmitting the two quaternary elements A and B. Both these elements are transmitted, as elements *a*, *b* have been transmitted to FIG. 4, i.e., the elements A, B, −A, −B are sent successively, each element A or B being able to assume levels −V, −3V, +V and +3V. These conditions are indicated in FIG. 5*b*. In lines $L_1$ to $L_7$ of FIG. 5*b*, some combinations of values *a*, *b*, *c*, *d*, with the corresponding values of A and B and the signals sent over the line have been represented. The sine curves in dotted lines show that these signals are similar to those of FIG. 4 but besides, with a kind of phase and amplitude modulation, which is a function of the absolute relative value of levels A and B.

These signals when sent along the line behave as the spectrum $\Phi$ (FIG. 1*b*) of the basic signal with a phase-amplitude modulation.

Figure 6:
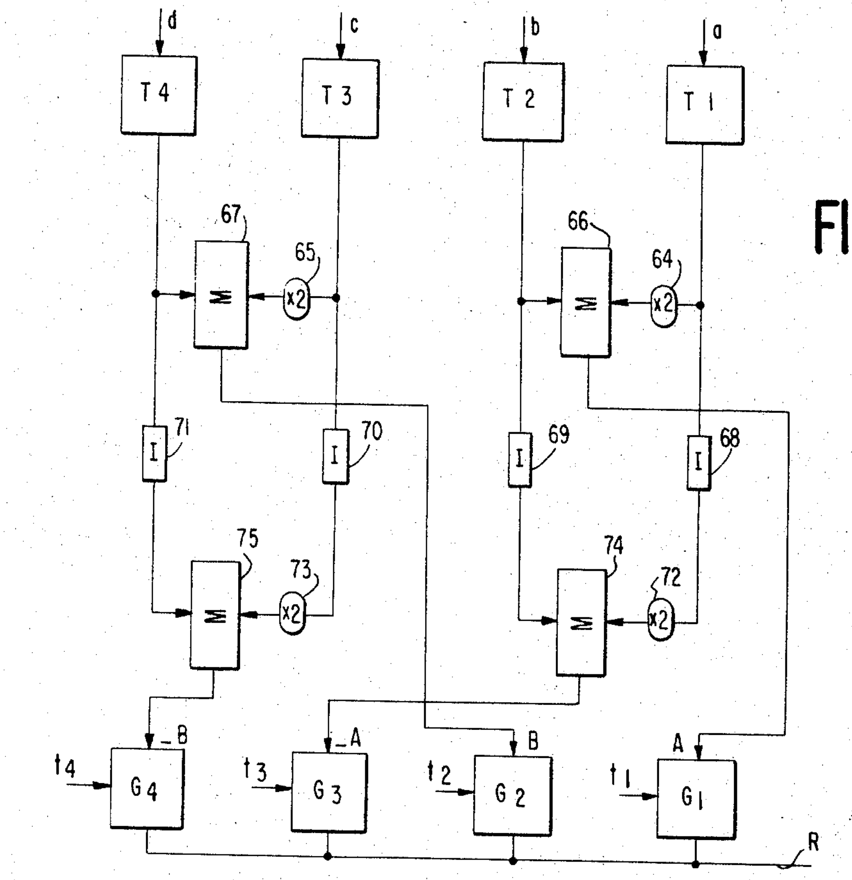

FIG. 6 shows apparatus for forming from four binary elements the waveforms of FIG. 5*b*. Binary elements *a*, $b, c, d$ are stored in triggers $T_1$, $T_2$, $T_3$, $T_4$; these triggers deliver voltages $\pm V$ in function of the value of $a, b, c, d$ to the encoding circuits. The encoding circuit to form A includes multiplier 64 and analog adder 66. Similarly, the encoding circuit to form B includes multiplier 65 and analog adder 67. The inverse encoding circuit to form —A includes inverters 68 and 69, multiplier 72 and analog adder 74. The inverse encoding circuit to form —B includes inverters 70 and 71, multiplier 73 and analog adder 75. Gates $G_1$, $G_2$, $G_3$, $G_4$ serially apply elements A, B, —A, —B to line R. The gates are operated by successive timing pulses $t_1$, $t_2$, $t_3$, $t_4$; each timing pulse has a duration of .25 T second. Line R acts to collect the elements A, B, —A, —B as they are gated out by the timing pulses.

Timing pulses $t_1$, $t_2$, $t_3$, $t_4$ have a duration of .25 T second because there are four output elements A, B, —A, —B. If the input elements were only two, $a$ and $b$, then the only output elements of interest would be A and —A. Accordingly $G_2$ and $G_4$ would not be gated while $G_1$ and $G_3$ would be gated with successive timing pulses $t_1$ and $t_3$ each having a duration of .5 T second.

Figure 7A:
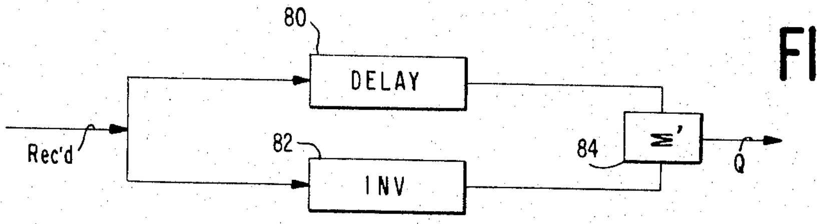
Figure 7B:
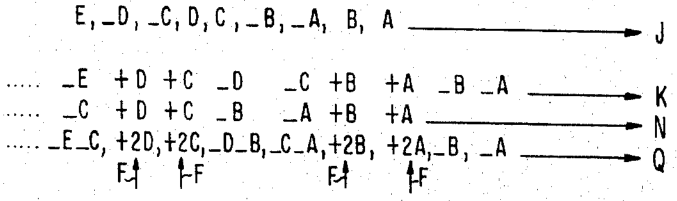

When the signals occur serially at the receiving station, FIG. 7*a*, they are applied in parallel to delay device 80 and to an inverter 82. The output of inverter 82 and the output of the delay devices 80 are applied to adder 84. The output Q of adder 84 delivers a group of signals out of which, at determined times F, some elements corresponding to multiples of the basic elements are selected. It has been found, by computation and experiments, that such a detection is quite efficient, as concerns the elimination of noise influences, for it uses the redundancy of the transmission in which all elements have been sent twice, since a combination of the elements and their inverses are sent along the line. FIG. 7*b* concerns the dispatch of binary elements in groups of four, according to the above described method, by which elements A and B are sent over the line (with $A=2a+b$ and $B=2c+d$). Let it be supposed that the received message comprises a series of such elements: line J represents them from right to left in the order of their arrival; line K represents them after their passage through inverter 82, line N represents them at the output of delay device 80 which provides a delay equal, in this example, to the duration of two elements such as A. The line Q represents the elements at the output of the adder on line Q. By testing these values at instants "F," selection is made of the elements corresponding to 2A, 2B, 2C, 2D, in algebraic values. It is to be noted as shown by the example, that these instants F are not systematically spaced equally and may not occur with a simple periodicity; these instants are established in function of the code.

The possible levels of A (or B) being in the present case: —3V, —V, +V, +3V, the possible levels of 2A and 2B will be —GV, —2V, +2V, +GV; by sending the selected elements to a decoder of the suitable level, which may be of a known type, one may collect the values of $a, b, c, d$ in the present example:

$$a=(\text{sign of } A)\ V$$
$$b=-(\text{sign of } A)\ V \text{ if } |A|<2V$$
$$+(\text{sign of } A)\ V \text{ if } |A|>2V$$

Figure 8:
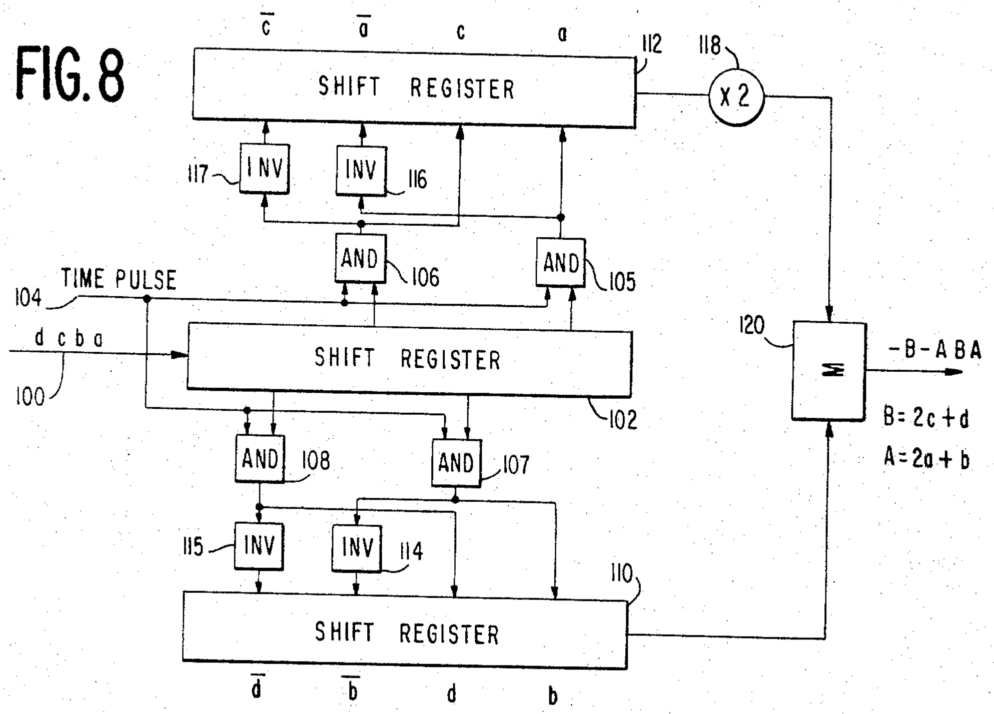
FIG. 8 shows another embodiment for performing the operations of FIGS. 5*a* and 5*b*.

In another embodiment of the invention, at the transmitter the inversion and delay takes place prior to the encoding of plural bits into data pulses. Referring to FIG. 8, the binary bits arrive on line 100 and enter shift register 102. Timing pulse 104 gates the contents of shift register 102 out each time after four bits have entered shift register 102. The timing pulse is applied to AND gates 105, 106, 107, 108 to gate the bits into a memory consisting of shift registers 110 and 112.

The final encoded data pulses are generated according to formulas on the righthand side of FIG. 8, i.e., $A=2a+b$, $B=2c+d$. To operate according to this formula shift register 112 must contain from right to left the bits $a$, $c$, $\bar{a}$, $\bar{c}$ and the shift register 110 must contain from right to left the bits $b$, $d$, $\bar{b}$, $\bar{d}$. Inverters 114, 115, 116, and 117 invert $a, b, c, d$ so that —A and —B may be generated. When shift registers 110 and 112 are filled, they are serially read out to the left. The encoder which consists of multiplier 118 and summer 120 then acts to form the data pulses A, B, —A, and —B. The delay in this case is handled directly by the gating or shifting of the shift registers such that —A follows A by .5T and —B follows B also by .5T. In other words a bit is gated out of shift registers 110 and 112 once every .25T second.

Figure 9:
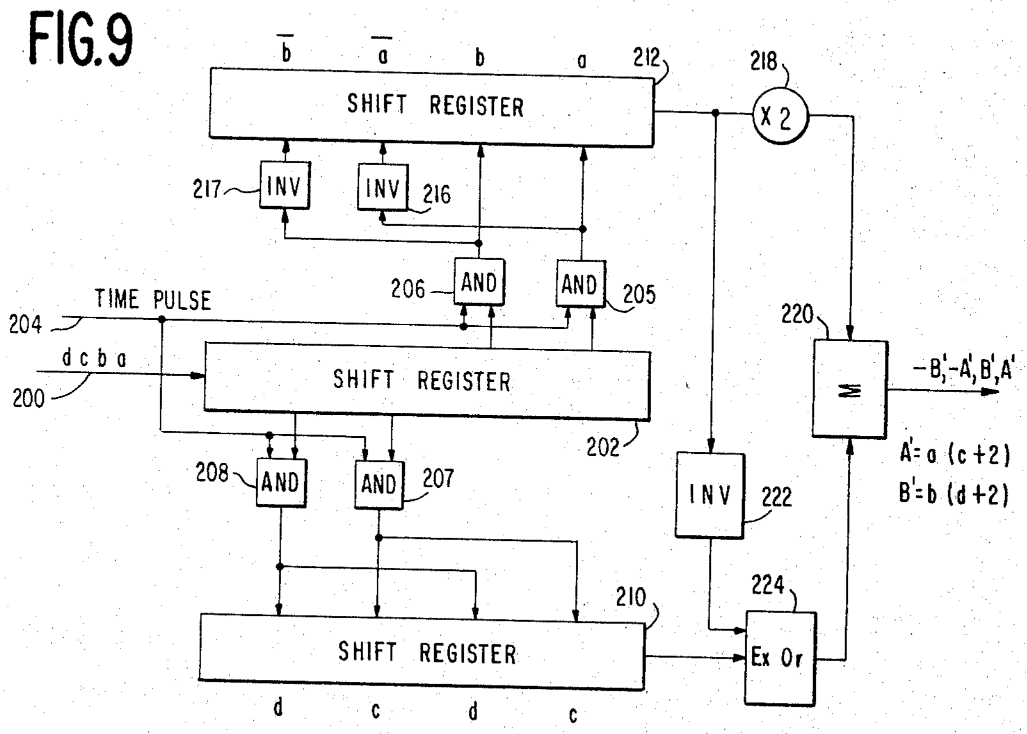
FIG. 9 shows another embodiment which achieves the inverted repetition of elements A′ and B′ with four levels derived from four binary elements (bits).

FIG. 9 shows apparatus similar to FIG. 8 but where the encoding operation has been changed to represent the equation shown in the right hand side of FIG. 9, i.e., $A'=a(c+2)$, $B'=b(d+2)$. Four binary bits on line 200 enter shift register 202. Timing pulse 204 gates four bits by means of AND gates 205, 206, 207, and 208 to shift registers 210 and 212. Inverters 216 and 217 are provided so that the encoding circuit will generate —A′ and —B′. The encoding circuit includes multiplier 218, summer 220, inverter 222, and exclusive OR 224. Multiplier 218 acts to form $2(a, b, -a \text{ or } -b)$. Inverter 222 and exclusive OR 224 act to multiply $\pm a$ and $\pm b$ times $c$ and $d$ respectively. Summer 220 combines the two signals and obtains the resultant A′, B′, —A′ and —B′. It will be apparent to one skilled in the art that other encoding schemes, inverting means and delaying means could be substituted in the embodiments shown in FIGS. 6, 8, and 9.

Figure 10:
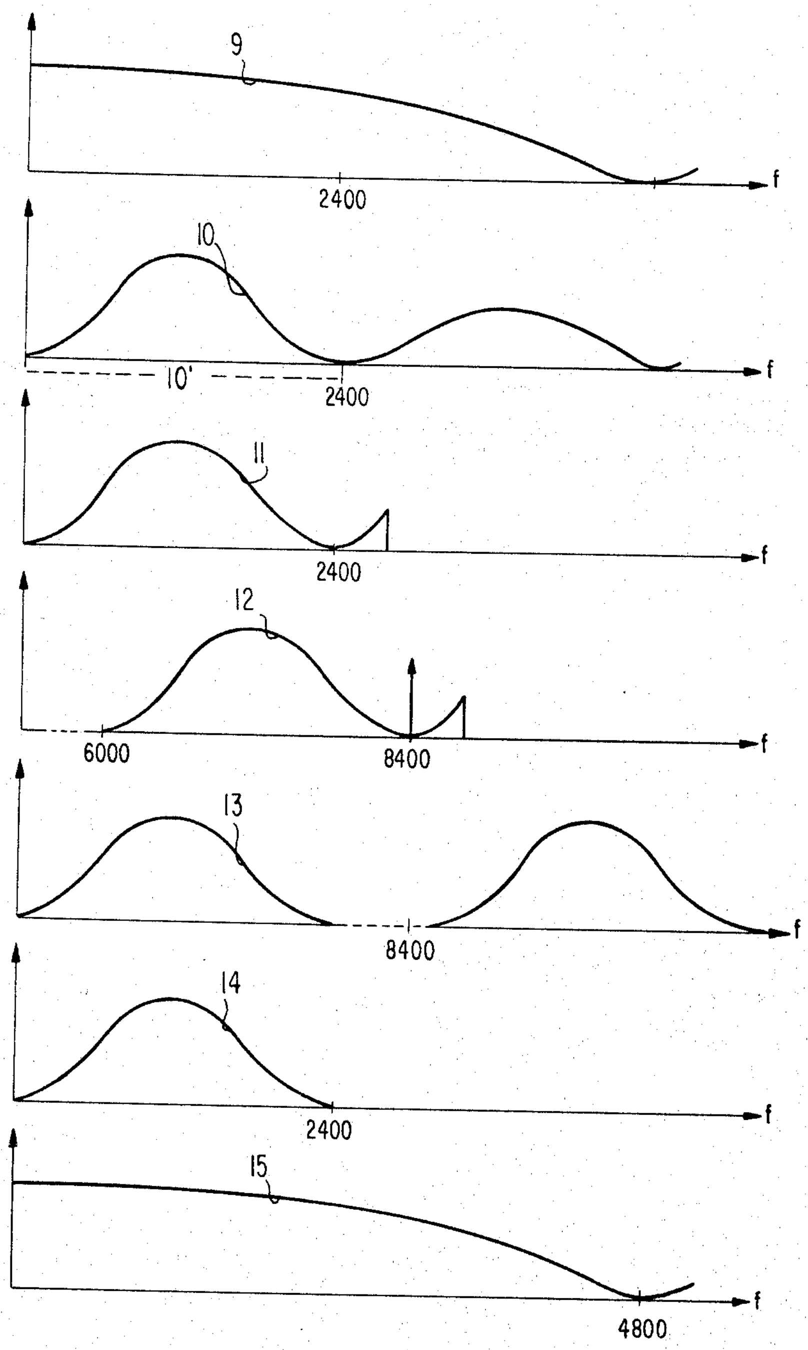
FIG. 10 represents a transmission system.

FIG. 10 provides an example of the transmission of such data along a telephone system.

Curve 9 is an example of a spectrum for the original data.

Curve 10 shows the spectrum of same data after the transcoding operation according to the invention wherein the portion 10′ contains all useful information and is sufficient.

In view of their transmission along the system, by a filtering operation which is function of the system, the band to be transmitted is selected in curve 11. An eventual frequency translation and a pilot frequency injection situate it for example in the frequency spectrum according to curve 12 for its transmission in a single side band with carrier.

Curve 13 shows the spectrum at the end of the line after the demodulation, then after the filtering in curve 14. After the detection according to the invention, and a possible decoding, the data collected are the data with a spectrum according to curve 15.

While the invention has been particularly shown and described with reference to preferred embodiments thereof, it will be understood by those skilled in the art that various changes in form and details may be made without departing from the scope of the invention.

What is claimed is:

1. Data transmission apparatus for generating a signal, from data, which has a frequency spectrum that is matched to the bandpass characteristic of a transmission line comprising:

data pulse source for generating a data pulse having a duration not greater than .5T second where T is the period of a frequency $1/T$ equal to ½ bandwidth of the transmission line bandpass characteristic;

inverting means responsive to said source for inverting the data pulses;

delay means responsive to said inverting means for delaying the inverted data pulse by .5T second; and collecting means responsive to said source and said delay means for collecting the data pulse and the inverted delayed data pulse so that the composite signal is the data pulse followed by the inverted data pulse .5T second after the start of the data pulse.

2. The data transmission apparatus of claim 1 wherein the data pulse source includes:

encoding means for encoding $n$ binary bits into a data pulse having one of $2^n$ possible levels, each level corresponding to a different combination of binary values for the binary bits.

3. Data transmission apparatus for generating a signal from data which has a frequency spectrum that is matched to the bandpass characteristic of a transmission line comprising:

a source of $n$ binary bits;

encoding means responsive to said source to encode $n$ binary bits into a first D.C. signal having one of $2^n$ possible levels, each level corresponding to a different combination of binary values for the binary bits;

inverse encoding means responsive to said source to encode the $n$ binary bits into a second D.C. signal constituting the inverse of the first D.C. signal;

first gating means responsive to said encoding means for gating out a first pulse having a level equal to the first D.C. signal and a duration less than .5T second where T is the period of a frequency $1/T$ equal to ½ bandwidth of the transmission line bandpass characteristic;

second gating means responsive to said inverse encoding means for gating out a second pulse having a magnitude equal to the second D.C. signal and a duration less than .5T second, said second gating means being operative to gate out the second pulse .5T second after said first gate starts to gate out the first pulse; and collecting means responsive to said first and second gating means for collecting the first and second pulses so that the first pulse is followed by a pulse constituting the inverse of the first pulse .5T second after the start of the first pulse.

4. Data transmission apparatus for generating a signal, from data, which has a frequency spectrum that is matched to the bandpass characteristic of a transmission line comprising:

a data pulse source for generating successive pulses having a combined duration not greater than .5T second where T is the period of frequency $1/T$ equal to ½ bandwidth of the transmission line bandpass characteristic;

inverting means responsive to said source for inverting each of the successive pulses;

delay means responsive to said inverting means for delaying each of the inverted successive pulses .5T seconds; and collecting means responsive to said source and said delaying means for collecting the successive pulses and inverted delayed successive pulses so that the collected signal is the successive pulses followed by the inverted successive pulses with each inverted pulse following the start of the corresponding uninverted pulse by .5T second.

5. The data transmission apparatus of claim 4 wherein the data pulse source includes:

a plurality of encoding means, each encoding means for encoding $n$ binary bits into a pulse having one of $2^n$ possible levels, each level corresponding to a different combination of binary values for the binary bits.

6. Data transmission apparatus for generating a signal, from data, which has a frequency spectrum that is matched to the bandpass characteristic of a transmission line comprising:

a source of binary bits for generating data bits to be transmitted;

inverting means responsive to said source for inverting data bits and providing inverted data bits;

memory means responsive to said source and said inverting means for storing the data bits and inverted data bits;

encoding means responsive to said memory means for encoding $n$ binary data bits into a pulse having $2^n$ possible levels, each level corresponding to a different combination of binary values for the binary data bits; and gating means for gating the data bits stored within said memory means and the inverted data bits stored within said memory means from said memory means serially to said encoding means, said gating means acting to gate the data bits from said storage means during a first interval of .5T second where T is the period of frequency $1/T$ equal to ½ bandwidth of the transmission line bandpass characteristic, said gating means also acting to gate the inverted data bits from said storage means during a succeeding interval of .5T second so that said encoding means will serially encode pulses followed by corresponding inverse pulses .5T second after the start of the pulses.

7. Data transmission apparatus for generating a signal, from data, which has a frequency spectrum that is matched to the bandwidth characteristics of a transmission line comprising:

a data pulse source for generating successive pulses having a combined duration less than .5T second where T is the period of frequency $1/T$ equal to ½ the bandwidth of the transmission line bandpass characteristic;

first inverting means responsive to said data pulse source for inverting each of the successive pulses;

first delaying means responsive to said inverting means for delaying each of the inverted successive pulses 5T second;

collecting means responsive to said data pulse source and said first delaying means for collecting the successive pulses and the inverted delayed successive pulses so that the collected signal is the successive pulses followed by the inverted successive pulses with each inverted pulse following the start of the corresponding uninverted pulse by .5T second;

second delaying means responsive to said collecting means for delaying .5T second the successive pulses and the inverted successive pulses;

second inverting means responsive to said collecting means for inverting the successive pulses and the inverted successive pulses; and summing means responsive to said second delaying means and said second inverting means to sum the delayed pulses and the twice inverted successive pulses so that the successive pulses are reinforced while the inverted successive pulses are not reinforced.

8. Data transmission apparatus for generating a signal, from data, which has a frequency spectrum that is matched to the bandpass characteristic of the transmission line comprising:

data signals having a non-zero portion of duration not greater than .5T second followed by a zero portion not less than .5T second generated by a data pulse source and where the total duration of said data signal is T seconds where T is the period of a frequency $1/T$ equal to ½ the bandwidth of the transmission line bandpass characteristic;

inverting means responsive to said data pulse source for inverting the data signals;

delay means responsive to said inverting means for delaying the inverted signals by .5T second; and collecting means responsive to said data pulse source and said delay means for collecting the data signals and the inverted delayed data signals so that the composite signal is the non-zero portion of the data signal followed by the inverted non-zero portion of the data signal .5T seconds after the start of the non-zero portion of the data signal.

9. The data transmission apparatus of claim 8 wherein the data pulse source includes:

encoding means for encoding $n$ binary bits into a data pulse having $2^n$ possible levels, each level corresponding to a different combination of binary values of the binary bits.

10. Data transmission apparatus for generating a signal, from data, which has a frequency spectrum that is matched to the bandpass characteristic of the transmission line comprising:

successive data signals having a non-zero portion of duration of not greater than .5T second followed by a zero portion not less than .5T second generated by a data pulse source where the total duration of said data signal is T seconds and said data signal has a repetition rate of one data signal every T seconds where T is the period of a frequency $1/T$ equal to ½ the bandwidth of the transmission line bandpass characteristic;

inverting means responsive to said data pulse source for inverting the data signals;

delay means responsive to said inverting means for delaying the inverted signals by .5T second; and collecting means responsive to said data pulse source and said delay means for collecting said data signals and said inverted delayed data signals so that the composite output is the non-zero portion of said data signal followed by the inverted non-zero portion of said data signal .5T second after the start of the non-zero portion of said data signal.

11. The data transmission apparatus of claim 10 wherein the data pulse source includes:

a plurality of encoding means, each encoding means for encoding $n$ binary bits into a pulse having one of $2^n$ possible levels, each level corresponding to a different combination of binary values for the binary bits.

12. A data transmission device for generating a signal, from data, which has a frequency characteristic matched to the bandpass characteristic of a transmission line comprising:

a source of binary bits for generating data bits to be transmitted;

inverting means responsive to said source for inverting said data bits;

storage means responsive to said source and said inverting means for storing at least four serial data bits and at least four inverted serial data bits;

encoding means responsive to said storage means for encoding 2 binary data bits into one of four possible levels, each level corresponding to a different binary combination of the 2 binary data bits;

gating means for gating the first two data bits of said serial data bits from said storage means to said encoding means during a period of time $T/4$ where T is the period of the frequency $1/T$ equal to ½ the bandwidth of the transmission line bandpass characteristic, said gating means acting to gate the second two data bits of said serial data bits from said storage means to said encoder during the second $T/4$ time period, said gating means acting during the third and fourth $T/4$ periods to gate the first two inverted serial data bits and the second two inverted serial data bits to said encoder so that the first two data bits are encoded in the first $T/4$ period and the second two data bits are encoded in the second $T/4$ period and the third and fourth $T/4$ periods represent the inverse of the first two $T/4$ periods respectively.

13. A data transmission apparatus for generating from a data bit source a signal which has a frequency spectrum that is matched to the bandpass characteristic of a transmission line comprising:

a source of binary bits for generating data bits to be transmitted, said source providing $n$ data bits every T seconds where $n$ is an even number and T is the period of the frequency $1/T$ equal to ½ the bandwidth of the transmission line bandpass characteristic;

inverting means responsive to said source for inverting the data bits;

storage means responsive to said source and said inverting means for storing data bits and inverse data bits;

encoding means responsive to said storage means for encoding $.5n$ data bit at a time into a pulse having $2^{.5n}$ possible levels, each level corresponding to a unique binary combination of $.5n$ data bit;

gating means for gating the first $.5n$ data bit from said storage means to said encoder during a $T/4$ time period, said gating means acting in subsequent $T/4$ time periods to gate the second $.5n$ data bit, the first $.5n$ inverted data bit and the second $.5n$ inverted data bit from said memory means to said encoding means;

whereby the output of said encoding means corresponds to a signal having the first $T/4$ time period corresponding to an analog encoding of the first $.5n$ data bit, the second $T/4$ time period corresponding to the analog encoding of the second $.5n$ data bits, the third and fourth $T/4$ time periods corresponding to the inverse of the first and second $T/4$ time periods, and the average value of the composite output of the encoder over the time period T is a constant value.

References Cited

UNITED STATES PATENTS

| | | | |
|---|---|---|---|
| 3,008,124 | 11/1961 | Warnock | 328—55 X |
| 3,162,724 | 12/1964 | Ringelhaan | 178—68 |
| 3,230,310 | 1/1966 | Brogle | 178—68 |
| 2,759,047 | 8/1956 | Meacham | 328—164 X |

ROBERT L. GRIFFIN, *Primary Examiner.*

WILLIAM S. FROMMER, *Assistant Examiner.*

U.S. Cl. X.R.

178—68; 328—55